United States Patent [19]

Miyashita et al.

[11] Patent Number: 4,983,893

[45] Date of Patent: Jan. 8, 1991

[54] ACTUATOR WITH STEPPING MOTION FUNCTION

[75] Inventors: Kunio Miyashita, Hitachi; Hiroshi Hayashida, Mito; Tadashi Takahashi; Syooichi Kawamata, both of Hitachi, all of Japan

[73] Assignee: Hitachi, Ltd., Tokyo, Japan

[21] Appl. No.: 678,486

[22] Filed: Dec. 5, 1984

[30] Foreign Application Priority Data

Dec. 7, 1983 [JP] Japan .................. 58-229893

[51] Int. Cl.$^5$ .......................... H02K 33/00
[52] U.S. Cl. ..................... 318/135; 310/27
[58] Field of Search ............ 318/135; 310/12–19

[56] References Cited

U.S. PATENT DOCUMENTS 4,318,038 3/1982 Munehiro .................. 310/27 X

Primary Examiner—Mark O. Budd
Attorney, Agent, or Firm—Antonelli, Terry, Stout & Kraus

[57] ABSTRACT

An actuator has a stepping motion function with a high stopping accuracy and resolution. The actuator includes a fixed portion and a movable portion constructed in combination so as to be movable relative to each other, a coil for imparting a moving force to the movable portion, a magnetic recording medium mounted on one of the fixed portion and the movable portion and recording magnetic signals, and a plurality of magnetic sensors mounted on the other thereof for detecting said magnetic signals in said magnetic recording medium, and wherein signals different in phase and output from said respective sensors are used by themselves, or signals inversely converted from the former signals are additionally used, and the coil is supplied with a driving force command by sequentially selecting and changing those signals.

10 Claims, 5 Drawing Sheets

ACTUATOR WITH STEPPING MOTION FUNCTION

The present invention relates to an actuator having a function to move stepwise, and more particularly it relates to an actuator capable of setting a position stepwise. The actuator now concerned is applicable to both types, that is, a type with a rotary moving body like a usual motor and another type with a linear moving body, however, the latter type is particularly preferable. The present invention may demonstrate its remarkable effects when the actuator is used with a mechanical apparatus requiring a high precision position setting in the order of less than several tens μm.

A recent development in information industries is very remarkable. In particular, office automation related machines have been under a rapid development to meet the requirements of improving labor efficiency and wasting less natural resources.

At the same time, actuators used in such office automation related machines are required to provide miniaturization, high speed, and high precision. For instance, with those actuators for driving a head of a floppy disk drive, it is essential to reduce the space between tracks and improve a stop speed as a high density magnetic recording onto a floppy disk is carried out.

In the prior art, stepping motors described in the specification and drawings of U.S. Pat. No. 4,288,709 have generally been used for driving a floppy disk head. However, as is widely known in the art, the number of teeth of the stepping motor iron core have to be increased in order to make the amount of each stepping advancement smaller. However, as the number of teeth increase, the pitch of teeth becomes shorter thereby resulting in a difficulty in machining and a degradation in precision of the pitch. More in addition, as the pitch of teeth becomes shorter, reluctance variation in association with the generation and magnitude of a driving force such as a torque or thrust force becomes small. As a result, there arises a problem that a driving force generated also becomes small.

In contrast with the above, a system has recently been made public in which a moving coil type actuator is utilized and a servo control is achieved by a feedback signal recorded on a floppy disk. This system, however, is not compatible with other systems thereby leaving a disadvantage of inability to use it for a multipurpose.

It is an object of the present invention to provide a novel actuator which is small in size and has a function of stepwise advance with a high precision.

A feature of the present invention is that in an actuator including a fixed portion and a movable portion wherein a sensor mounted on either one of the fixed portion and the movable portion is provided for detecting the amount of movement of the movable portion relative to the fixed portion, and wherein the movement of the movable portion is controlled in accordance with the output from the sensor; a plurality of sensors, for example, two sensors are used, and the actuator comprises a signal processing circuit for processing sensor output signals a and b from the respective two sensors and inversely converted signals a and b from the sensor output signals $\bar{a}$ and $\bar{b}$ a driving force command circuit for generating a driving force by sequentially selecting one of the signals a, b, $\bar{a}$ and $\bar{b}$ in accordance with a position command; and a driving force control circuit for controlling a driving force of the actuator in accordance with the driving force command.

Another feature is that in an actuator including a fixed portion and a movable portion wherein a sensor is provided facing the movable portion for generating each phase; the sensor generates n phase outputs (n≧3); and the actuator comprises a driving force command circuit for generating a driving force by sequentially selecting one of the n outputs in accordance with a position command; and a driving force circuit for controlling a driving force of the actuator in accordance with the driving force command.

The present invention will be apparent from the following detailed description taken in conjunction with the accompanying drawings, in which.

Figure 5:
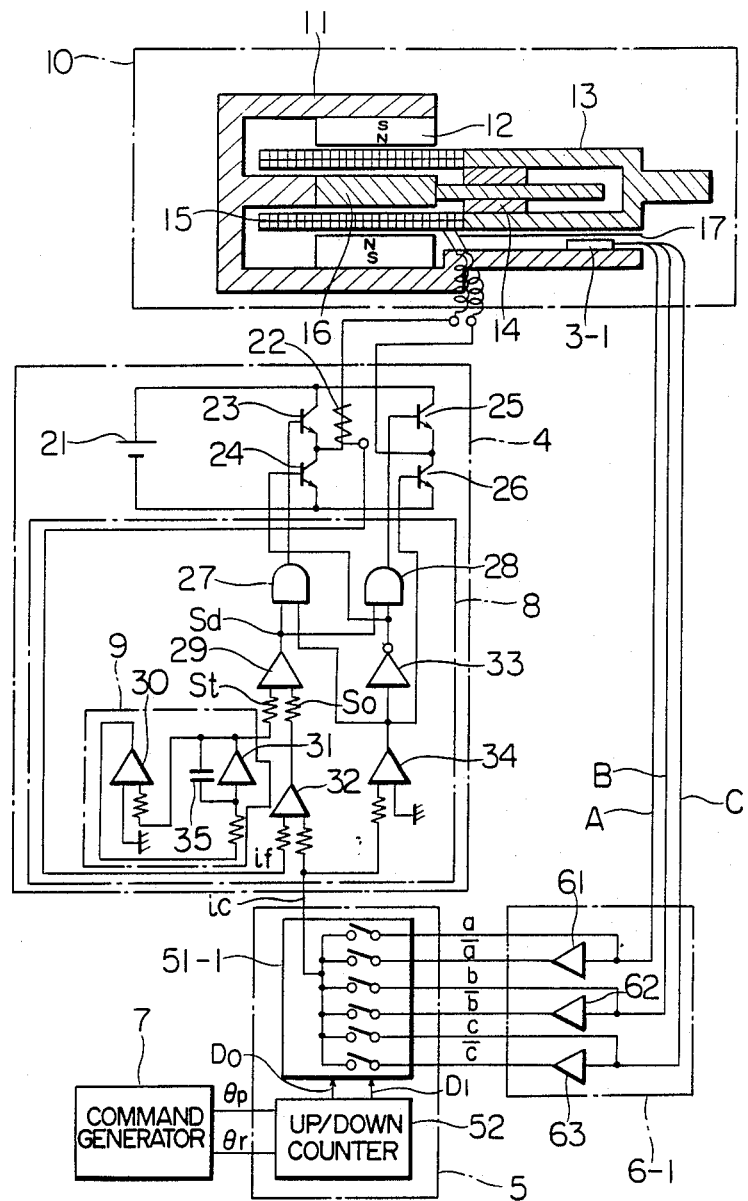
FIG. 5 is a brief diagrammatic view showing the arrangement of an actuator with a stepping motion function according to another embodiment of the present invention.
Figure 6:
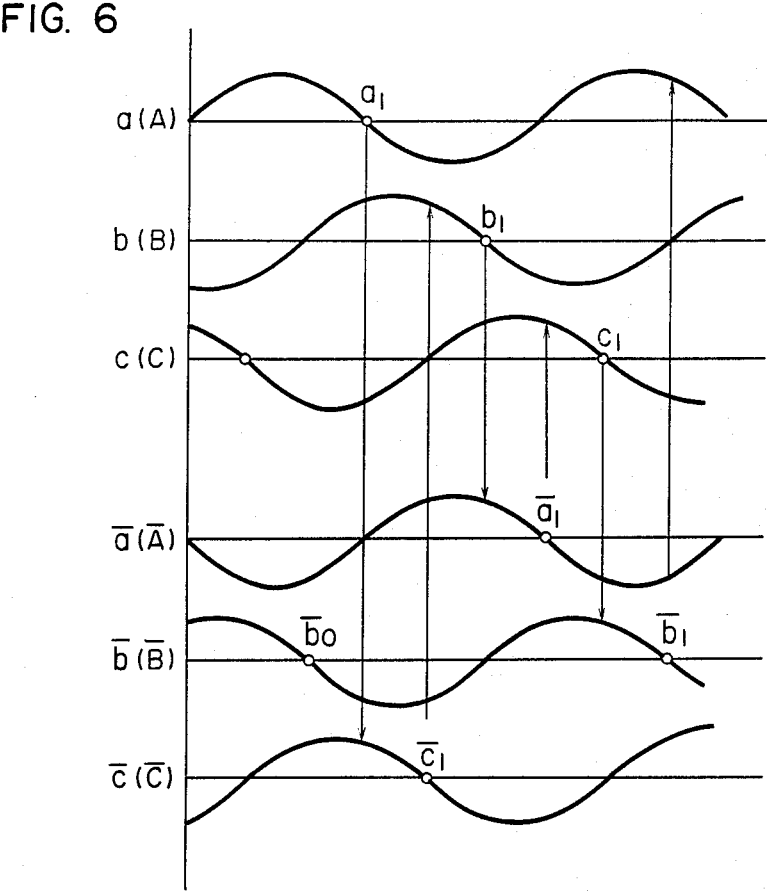
Figure 7:
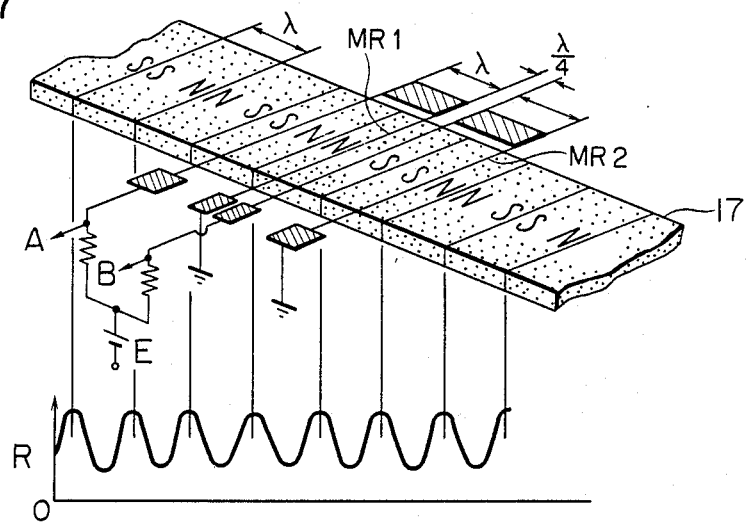

FIG. 6 a view for illustrating a relation between sensor outputs and fundamental operation of the actuator shown in FIG. 5, wherein the relative phases of the sensor outputs are particularly shown; and FIG. 7 is a brief view showing a relative position of the sensor and magnetically recorded signals on a magnetic coating of the moving part.

The above object of the present invention will become obvious from the following description with reference to the accompanying drawings.

According to the present invention, the operation as performed by the conventional stepping motor is achieved by the provision of a sensor and a control circuit.

More in particular, a sensor is provided facing the movable portion of the actuator, and one of output signals a and b and inversely converted signals $\bar{a}$ and $\bar{b}$ from the output signals a and b is sequentially selected in synchronization with a command pulse and in accordance with the sequentially selected sensor output signal, the current or voltage for the actuator winding is controlled.

The stepping operation is performed basing upon the sensor output signal so that a driving force generating mechanism such as of the teeth in a stepping motor can be dispensed with, and instead, the sensor and control circuit serve to function like the teeth in a stepping motor.

Figure 1:
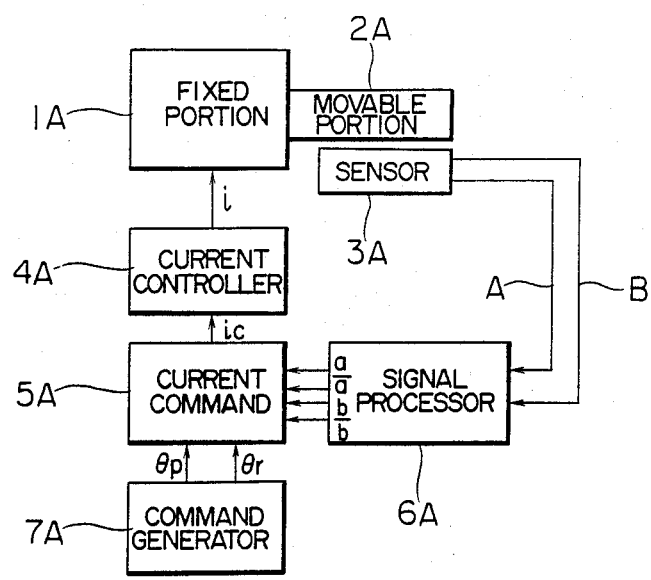
FIG. 1 is a block diagram showing a basic arrangement of an actuator with a stepping motion function according to the present invention.

FIG. 1 shows a basic arrangement of an actuator with a stepping motion function embodied basing upon the above technical concept.

In the figure, reference 1A denotes a fixed portion of the actuator, reference 2A denotes a movable portion of the actuator, and reference 3A generally denotes a sensor, in the embodiment, two sensors which are positioned facing the movable portion 2A of the actuator and generate outputs A and B different in phase by 90 degrees from each other. Reference 6A denotes a signal processing circuit for generating, in accordance with the two phase outputs A and B of the sensor 3A, signals a and b and its inversely converted signals $\bar{a}$ and $\bar{b}$, and reference 7A denotes a command generating circuit. Reference 5A denotes a current command circuit which sequentially selects, in accordance with commands $\theta_p$ and $\theta_r$ ($\theta_p$ represents a command of a pulse train associated with the number of steps, and $\theta_r$ represents a command of the direction of motion), one of the respective signals a, b, $\bar{a}$, and $\bar{b}$ from the signal processing circuit 6A, and basing upon the selected signal, generates a driving force command, e.g., a current command signal $i_c$. Reference 4A denotes a current control circuit for controlling the coil current $i_c$ of either the fixed portion 1A or the movable portion 2A of the actuator.

Figure 3:
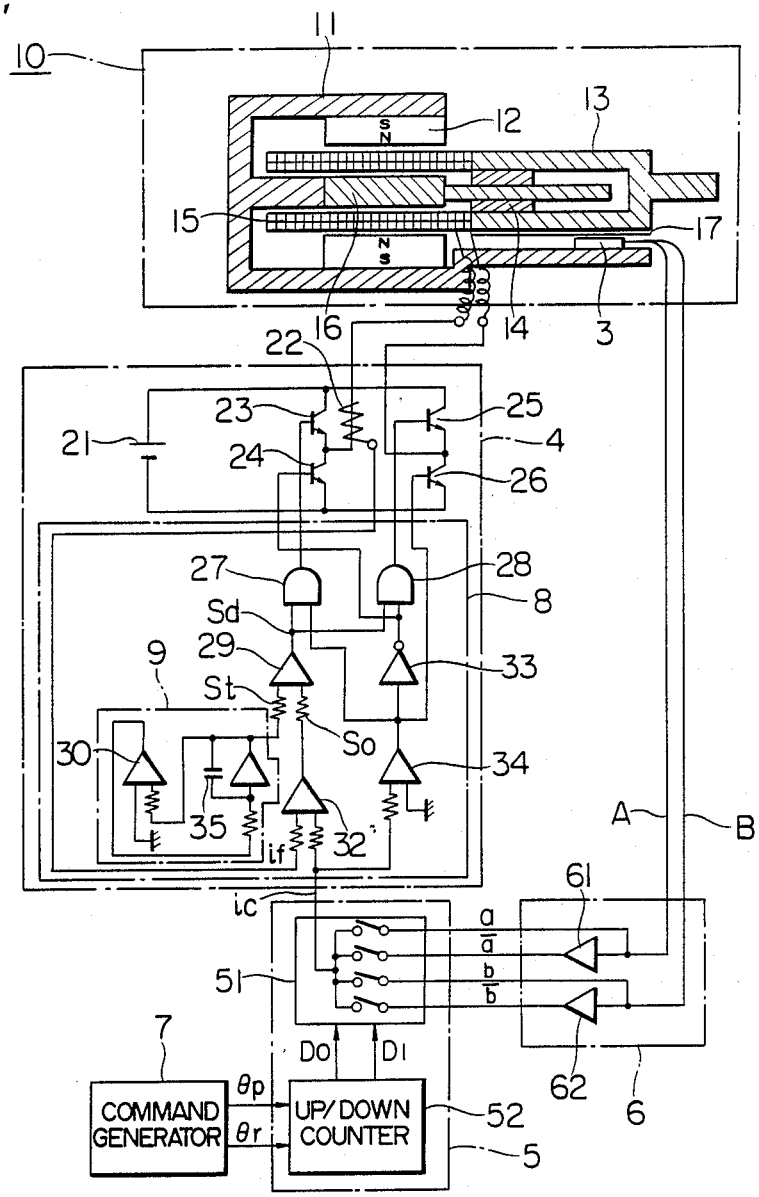
FIG. 3 is a brief diagrammatic view showing the arrangement of an actuator with a stepping motion function according to an embodiment of the present invention.

The signals a and b may be the outputs from the sensor itself, however as in the case that the signals A and B directly obtained from the sensor is too small, the signals A and B are amplified in an amplifier to obtain the signals a and b. In FIGS. 3 and 5 referred to later, the signals a and b are shown for simplicity purpose equal to the signals A and B.

A relative position of the sensor 3A and magnetically recorded signals on a magnetic coating described later are shown in FIG. 7. As seen from the figure, the magnetic coating 17 is formed therein recording magnetic recording signals such as NS, SN, NS ... in the longitudinal direction with a recording pitch of $\lambda$. The sensor 3A has a plurality of MR elements (Magneto Resistive Elements), two MR elements MR1 and MR2 being shown in the embodiment. Each of the two MR elements is disposed to have a parallel going return with a width of $\lambda$, and the two MR elements are separated by $\lambda/4$ (electrical angle is 90 degrees) from each other and disposed adjacent the magnetic coating. Since the MR element has a characteristic that internal electrical resistance decreases in accordance with magnetic field irrespective of its pole, a change of resistance of the MR element is obtained as shown in the figure.

With the arrangement shown in FIG. 1 and the sensor shown in FIG. 7, the direction and magnitude of the actuator current can be determined in accordance with the two phase signals a and b and inversely converted signals $\bar{a}$ and $\bar{b}$ from the sensor 3A comprising two MR elements MR1 and MR2.

Figure 2:
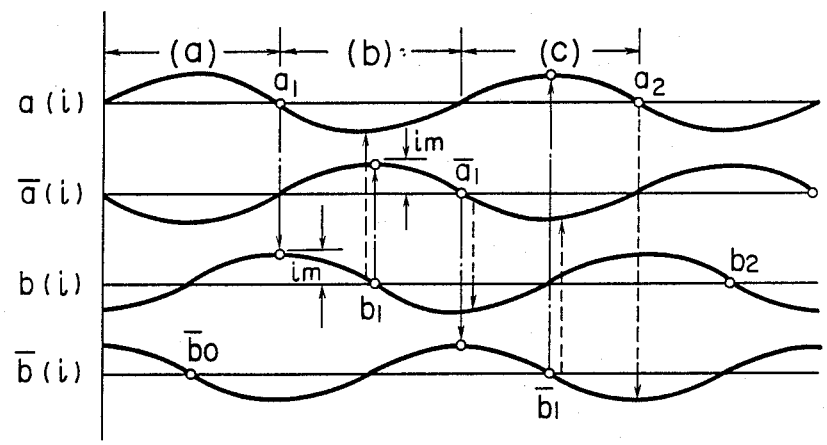
FIG. 2 is a view for illustrating a relation between sensor outputs and fundamental operation of the actuator, wherein the relative phases of the sensor outputs are particularly shown.

FIG. 2 is a view for illustrating a relation between the sensor outputs a, b, $\bar{a}$, and $\bar{b}$ and fundamental operation of the actuator, wherein the relative phases of the sensor outputs are particularly shown. At the same time, the figure shows the phase of the coil current i of the actuator which current derived basing upon the respective signals a, b, $\bar{a}$, and $\bar{b}$.

In FIG. 2, it is here assumed that the positive current generates a force directed to the right and that the negative current generates a force directed to the left. Then, the movable portion 2A moves positively in the right direction at a region (a) located at the left side of a point $a_1$, moves positively in the left direction at a region (b) at the right side of the point $a_1$, and stops at the point $a_1$.

Alternatively, the moving portion 2A moves in the right direction at a region (c) at the left side of a point $a_2$.

In other words, for the output signal a of the sensor 3A, points $a_1, a_2, \ldots$ are stable points and the movable portion 2A surely stops at these positions.

Similarly, a point $a_1$ is a stable point for the inversely converted signal $\bar{a}$, a point $b_1$ for the signal b, and a point $b_1$ for the inversely converted signal $\bar{b}$.

As appreciated from the figure, in order to move the actuator in the right direction, a signal is changed in the order of a→b→$\bar{a}$→$\bar{b}$→a as shown by a one dot chain arrow line in the figure, and on the contrary, in order to move the actuator in the left direction, a signal is changed in the order of a→$\bar{b}$→$\bar{a}$→b→a as shown by a broken arrow line in the figure.

In effect, the movable portion 2A is first assumed to be located at the point $a_1$ under the signal a, and then the signal b is used. In this case, the current command $i_c$ changes in correspondence to the increase of current from zero at the point $a_1$ to $i_m$. Thus, the movable portion 2A moves in the right direction until it stops at the point $b_1$.

Next, as the inversely converted signal $\bar{a}$ is used, the current command $i_c$ changes in correspondence with the increase of current again from zero at the point $b_1$ to $i_m$. Thus, the movable portion 2A moves in the right direction until it stops at the point $a_1$.

By repeating the above processes, it is possible to make the movable portion advance sequentially by the desired number of steps, in the right direction in the order of $a_1$→$b_1$43 $a_1$→$b_1$43 $a_2$. The similar processes are also applied to the movement in the left direction.

Therefore, actuators of the type that the direction of force is changed with the direction of current, can be used, and most of the electromagnetic machines are applicable. For instance, a DC motor of a rotary type and a voice coil of a linear type may be used.

Further, as a sensor, a rotary encoder and a linear encoder respectively for the rotary machine and for the linear actuator may be used.

As seen from FIG. 2, there are four points $a_1, a_1, b_1,$ and $b_1$ where the movable portion 2A can stop during one cycle. It is obvious that the stopping accuracy depends on the sensor precision.

It is noted that in order to minimize a difference of stopping positions with respect to various load conditions, the waveform obtained from the sensor may be shaped to have a trapezoid shape. Furthermore, the sensor output may be of n phase type outputs ($n \geq 3$), for example, three phase outputs A, B, and C.

Referring now to FIGS. 3 to 6, a description of an actuator having a function of stepwise movement which has been embodied basing upon the above principle and concept, will be made hereinafter.

Preferred embodiments of the actuator with stepping motion according to the present invention will be described with reference to FIGS. 3 to 7.

Figure 4:
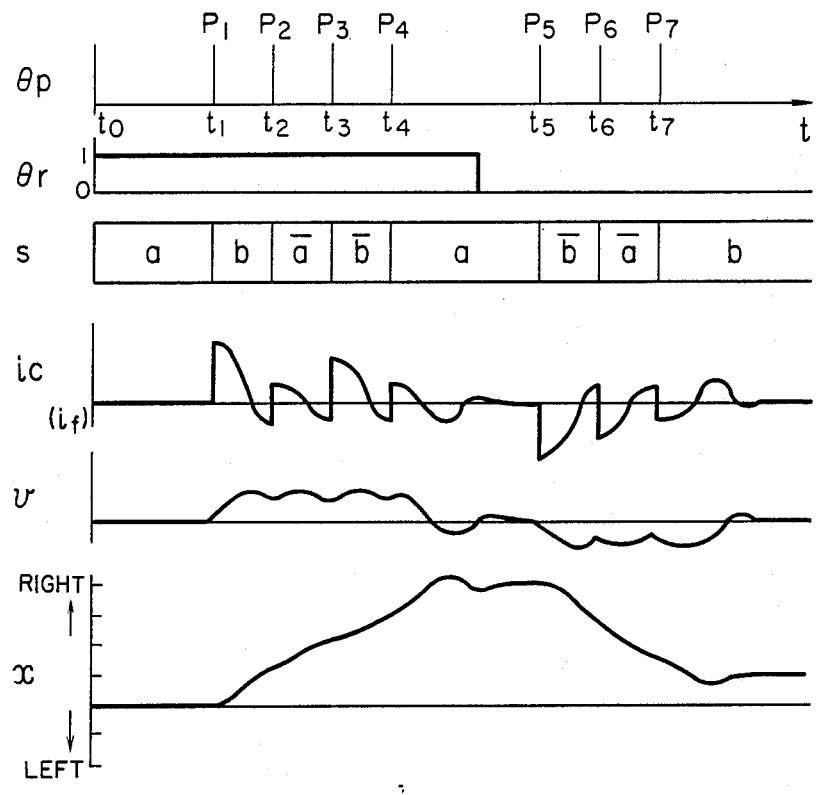
FIG. 4 is a timing chart for illustrating the operation of the actuator shown in FIG. 3.

FIG. 3 is a brief diagrammatic view showing the arrangement of an actuator with a stepping motion function according to an embodiment of the present invention, and FIG. 4 is a timing chart for illustrating the operation of the actuator shown in FIG. 3.

According to the embodiment, in an actuator including a fixed portion and a movable portion wherein a sensor mounted so as to face the movable portion is provided for generating each phase output; two MR elements spaced apart from each other by $\lambda/4$ are used as a sensor, and the actuator comprises a signal processing circuit for processing MR element sensor output signals a and b from the respective two. MR elements and inversely converted signals $\bar{a}$ and $\bar{b}$ from the sensor output signals a and b; a current command circuit for generating a current command by sequentially selecting one of the signals a, b, ā, and b̄ in accordance with a position command; and a current control circuit for controlling a current of the actuator in accordance with the current command.

Referring now to FIG. 3, reference number 10 denotes a moving coil type linear actuator in which a permanent magnet 12 and a pole piece 16 are disposed on the inner face of a fixed portion 11. The intermediate space therebetween is provided with a coil 15, and the coil current and associated magnetic flux generate a thrust force. A movable portion 13 in direct coupling relation to the coil 15 is supported with a sliding bearing for movement in the right and left directions.

A sensor 3 is disposed facing the movable portion 13 so as to detect the position of the movable portion 13. The sensor 3 is made of a magneto resistive element and can measure the position in accordance with the increase or decrease of the amount of magnetic field of magnetic poles on a magnetic coating 17 deposited on the movable portion 13 (refer to FIG. 7).

The movable portion 13 of the linear actuator 10 constructed as above can linearly move in the right or left direction by making a positive or negative current flow through the coil 15. In correspondence with the linear motion of the movable portion 13, the sensor 3 generates two phase outputs A and B different in phase by 90 degrees.

Reference number 6 denotes a signal processing circuit which generates and outputs signals a and b corresponding to the two phase outputs A and B, and previously mentioned inversely converted signals ā and b̄ obtained from the signals a and b through analog inverters 61 and 62.

Reference number 7 denotes a command generating circuit, and reference number 5 denotes a current command circuit which selects one of the signals a, b, ā, and b̄ from the signal processing circuit 6 in accordance with a command from the command generating circuit 7, and which generates in accordance with the selected signal a current command signal $i_c$.

The current command circuit 5 comprises an UP/DOWN counter 52 and an analog multiplexer 51, the UP/DOWN counter 52 generating address signals D0 and D1 by counting up or counting down a pulse train command $\theta_p$ obtained from the command generating circuit 7 and relating to a pulse train signal commanding the number of steps, in accordance with a direction command $\theta_r$. The analog multiplexer 51 closes one of four switches in accordance with the address signals D0 and D1. With the help of the address signals D0 and D1, a current command signal $i_c$ changes in correspondence with the signal change, for example, in the order of a→b→ā→b̄.

Reference number 4 denotes a current control circuit for controlling a current flowing through the coil 15. More in particular, reference number 21 denotes a DC power source, and reference numbers 23 to 26 denote transistors connected in the form of an H character. The direction of a coil current is controlled by making the transistors 23 and 26 ON or by making the transistors 24 and 25 ON, and the amplitude of the coil current is controlled by the conductivities of the transistors. Reference number 22 denotes a current detector for detecting the coil current.

Reference number 8 denotes a pre-drive circuit for generating exciting signals for the transistors 23 to 26 after the process of comparing the current command signal $i_c$ with the detected coil current $i_f$. In the pre-drive circuit 8, the current command signal $i_c$ and the detected coil current $i_f$ are processed by an amplifier 32 to deliver an output S0 which in turn is compared by a comparator with a triangular wave signal $S_t$ from a triangular wave generating circuit 9. The triangular wave generating circuit 9 comprises two amplifiers 30 and 31, and generates a triangular wave by way of charge/discharge of a capacitor 35. A duty output $S_d$ is thus obtained by combining the triangular wave signal $S_t$ and the output S0 from the amplifier 32.

The signal of duty output $S_d$ is input to both one terminals of AND circuits 27 and 28. The other terminal of the AND circuit 27 is input with an output from a comparator 34 to which the current command signal $i_c$ has been applied in order to distinguish between positive and negative directions, while the other terminal of the AND gate 28 is input with the output from the comparator 34 through a NOT circuit 33. As a result, during a positive direction, the transistors 23 and 26 turn ON, while during a reverse direction, the transistors 25 and 24 turn ON.

With the above arrangement, the linear actuator 10 can stepwise move pursuant to a command from the command generating circuit 7.

A detailed description of the stepping motion will be given with reference to the timing chart shown in FIG. 4. In the figure, $\theta_p$ and $\theta_r$ represent commands from the command generating circuit 7. $\theta_p$ represents a pulse train command for commanding the number of steps for movement, and $\theta_r$ represents a command of the direction of movement wherein character 1 stands for a right direction and character 0 stands for a left direction in the figure. A character S represents a signal selected at the current command circuit 5, and $i_c$ represents a current command signal output from the current command circuit 5. Assuming that the response speeds of the pre-drive circuit 8 and the current control circuit 4 are sufficiently high, the detected coil current $i_f$ becomes substantially equal to the above output $i_c$. A character v represents a speed of the movable portion 13 of the linear actuator 10, and a character x represents the position of the movable portion 13.

During a time period $t_0$ to $t_1$, the signal a associated with an A phase output from the sensor 3 is selected, and the movable portion stops at a stable point of the signal a.

Next, at the time instant $t_1$, upon reception of a pulse signal $P_1$ associated with the pulse train command $\theta_p$, the signal b associated with the output B from the sensor 3 is selected. Then, the current command signal $i_c$ becomes positive, and accordingly pursuant to the $i_c$, the coil current starts to flow to thereby move the movable portion 13.

Next, during a time period $t_2$ to $t_4$, upon reception of pulse signals $P_2$ to $P_4$, the output from the sensor 3 is sequentially selected in the order of ā, b̄, a, so that the movable portion 13 moves as shown by x in the figure.

Next, during a time period $t_4$ to $t_5$, the movable portion 13 stops after a certain time lapse from the time instant t. At this time instant, the movable portion 13 has moved by four steps in the right direction.

Next, as the command becomes zero at an inter point during the time period $t_4$ to $t_5$, and a pulse signal $P_5$ is input at the time instant $t_5$, then the signal b̄ from the sensor 3 is selected instead of its previous signal a. As a result, the current command signal $i_c$ becomes negative and the coil current is reversed to thereby move the movable portion 13 in the left direction.

Thereafter, upon reception of pulse signals $P_6$ and $P_7$ respectively at time instants $t_6$ and $t_7$, the signals $\bar{a}$ and b from the sensor 3 are sequentially selected in this order, and after a certain time lapse from the time instant $t_7$, the movable portion 13 stops. Thus, the movable portion 13 stops after it has moved three steps in the left direction.

The embodiment so far has been described by exemplarily using a two phase sensor containing two MR elements, however, it is noted that the concept of the present invention may effectively be applied to a multiphase or more than three phase sensor for improving its resolution factor.

Next, an application to the multiphase sensor will be described.

FIG. 5 is a brief diagrammatic view showing the arrangement of an actuator with a stepping motion function according to another embodiment of the present invention, and FIG. 6 is a view for illustrating a relation between sensor outputs and fundamental operation of the actuator shown in FIG. 5, wherein the relative phases of the sensor outputs are particularly shown.

According to the second embodiment, in an actuator including a fixed portion and a movable portion wherein a sensor is provided facing the movable portion for generating each phase; the sensor generates n phase outputs ($n \geq 3$); and the actuator comprises a signal processing circuit for processing n signals of n phase outputs and n inversely converted signals from the respective n phase outputs, a current command circuit for generating a current command by sequentially selecting one of the 2n signals in accordance with a position command; and a current control circuit for controlling a current of the actuator in accordance with the current command. In the embodiment, a three phase sensor, $n=3$, having three MR elements has been employed, each element being disposed as spaced from each other by $\lambda/3$.

In FIG. 5, elements designated by identical number and character with those in the first embodiment of FIG. 3 are same in operation and construction as in the first embodiment. Reference 3-1 denotes a three phase sensor, reference 5-1 denotes a current command circuit, reference 51-1 denotes a multiplexer, reference 6-1 denotes a signal processing circuit, and reference numbers 61 to 63 denote analog inverters.

The present embodiment relates to an actuator using a three-phase sensor which delivers A, B, and C multiphase outputs delaying by 120 degrees from each other. With the three-phase sensor, it is possible, as seen from FIGS. 5 and 6, for the movable portion to move by a 60 degree step, by using three phase signals, a, b, and c relating to the outputs A, B, and C from the sensor 3-1, together with inversely converted signals, $\bar{a}$, $\bar{b}$, and $\bar{c}$ relating to the inverse signals of the respective outputs A, B, and C from the sensor 3-1.

In FIG. 6, points $a_1$, $b_1$, and $c_1$ are stable points of the signals a, b, and c respectively corresponding to the A, B, and C outputs, and points $\bar{a}_1$, $\bar{b}_1$, and $\bar{c}_1$ are stable points of the signals $\bar{a}$, $\bar{b}$, and $\bar{c}$ respectively corresponding to the A, B, and C outputs.

A stepping motion at 60 degree intervals may be attained, for example, as shown by a solid line in FIG. 6, by changing the selection of the signals as in the order of a→$\bar{c}$→b→$\bar{a}$→c→$\bar{b}$→a.

In the above embodiment, all of the three phase signals a, b, c, $\bar{a}$, $\bar{b}$, and $\bar{c}$ have been used, however, it is possible to provide an actuator which can move by a 120 degree step by using the same three-phase sensor so long as only the signals a, b, and c respectively corresponding to the A, B, and C outputs are used. More in particular, in this case, the signal processing circuit 6-1 shown in FIG. 5 is not used, and the six switches in the multiplexer 51-1 are reduced to three switches for the signals a, b, and c. Thus, it is possible to provide an actuator which can move by a 120 degree step. Further, it should be understood that other modifications using a multiphase sensor having more than three phases may readily be embodied in a similar manner as above, and the same effects may be obtained.

According to the present invention, an actuator capable of stepwise moving can be realized by using a sensor and a control circuit instead of providing teeth on the iron cores or the like. Therefore, by employing a high precision sensor, it is possible to realize an actuator capable of moving at an extremely small step length.

The object of the present invention can be attained by the above described arrangements, however, other than these arrangements, various modifications can be thought of which fall within the scope of the present invention. For example, following variations are possible. A commonly known DC motor including voice coil or the like can be utilized as a driving force generator so that miniaturization and high efficiency can be attained. The current command, current control circuit, and the like are replaced with a voltage command, voltage control circuit, and the like. The magnetic sensor may be an optical sensor. Further, a sensor of the type in which concave and convex portions are mechanically formed in either the fixed portion or the movable portion along the direction of movement and in which the sensor detects the position by detecting the change of magnetic reluctance caused by the concave and convex portions, may be used. The actuator may be of a rotary type or of a linear type. The sensor may be disposed at either side of the fixed portion or the movable portion. Lastly, the number of sensors are not limited to two or three, but any plural numbers can be adopted.

We claim:

1. An actuator with a stepping motion function, including a fixed portion and a movable portion constructed in combination so as to be movable relative to each other, an electrical conductor for applying a moving force to the movable portion, and a sensor mounted on either one of the fixed portion and the movable portion for detecting the position of the movable portion, wherein the control of position setting for the movable portion is performed in accordance with the outputs from the sensor; said sensor comprising a plurality of sensors which respectively generate signals different in phase while the movable portion moves, and driving force command means for supplying a driving force command to said conductor by sequentially selecting and changing, in accordance with a position command signal, one of the output signals from said plurality of sensors and signals obtained by processing said output signals, and in which said sensor is made of a magneto resistive element.

2. An actuator with a stepping motion function including a fixed portion and a movable portion constructed in combination so as to be movable relative to each other, an electrical conductor for applying a moving force to the movable portion, and a sensor mounted on either one of the fixed portion and the movable portion for detecting the position of the movable portion, wherein the control of position setting for the movable portion is performed in accordance with the outputs from the sensor; said sensor comprising a plurality of sensors which respectively generate signals different in phase while the movable portion moves, and driving force command means for supplying a driving force command to said conductor by sequentially selecting and changing, in accordance with a position command signal, one of the output signals from said plurality of sensors and signals obtained by processing said output signals, and in which output signals obtained from said respective plurality of sensors and inversely converted signals of said output signals as signals obtained by processing said output signals, are provided, said actuator further comprising a current command circuit generating a current command by sequentially selecting and changing, in accordance with said position command signal, one of said signals, and a current control circuit for controlling a current flowing through said conductor in accordance with said current command.

3. An actuator with a stepping motion function including a fixed portion and a movable portion constructed in combination so as to be movable relative to each other, an electrical conductor for applying a moving force to the movable portion, and a sensor mounted on either one of the fixed portion and the movable portion and the movable portion for detecting the position of the movable portion, wherein the control of position setting for the movable portion is performed in accordance with the outputs from the sensor; said sensor comprising a plurality of sensors which respectively generate signals different in phase while the movable portion moves, and driving force command means for supplying a driving force command to said conductor by sequentially selecting and changing, in accordance with a position command signal, one of the output signals from said plurality of sensors and signals obtained by processing said output signals, in which said sensor comprises three or more sensors and the space between said sensors is 360/n degrees (n is the number of sensors) in electrical angle, and said actuator further comprises a current command circuit for generating a current command by sequentially selecting, in accordance with said position command signal, one of said n signals, and a current control circuit for controlling a current flowing thorough said conductor in accordance with said current command.

4. An actuator with a stepping motion function according to claim 1, in which a magnetic recording medium such as magnetic coating is provided on said movable portion, magnetic signals are recorded at equal pitches in said magnetic recording medium, and said magnetic signals are detected by said magneto resistive sensor.

5. An actuator with a stepping motion function including a fixed portion and a movable portion constructed in combination so as to be movable relative to each other, an electrical conductor for applying a moving force to the movable portion, and a sensor mounted on either one of the fixed portion and the movable portion for detecting the position of the movable portion, wherein the control of position setting for the movable portion is performed in accordance with the outputs from the sensor; said sensor comprising a plurality of sensors which respectively generate signals different in phase while the movable portion moves, and driving force command means for supplying a driving force command to said conductor by sequentially selecting and changing, in accordance with a position command signal, one of the output signals from said plurality of sensors and signals obtained by processing said output signals, and in which changing said signal is carried out within 180 degrees in electrical angle.

6. An actuator with a stepping motion function including a fixed portion and a movable portion constructed in combination so as to be movable relative to each other, an electrical conductor for applying a moving force to the movable portion, and a sensor mounted on either one of the fixed portion and the movable portion for detecting the position of the movable portion, wherein the control of position setting for the movable portion is performed in accordance with the outputs from the sensor; said sensor comprising a plurality of sensors which respectively generate signals different in phase while the movable portion moves, and driving force command means for supplying a driving force command to said conductor by sequentially selecting and changing, in accordance with a position command signal, one of the output signals from said plurality of sensors and signals obtained by processing said output signals, and in which changing said signals is carried out in the same direction if said moving portion is to be moved in the same direction.

7. An actuator with a stepping motion function according to claim 1, in which said movable portion moves linearly.

8. An actuator with a stepping motion function according to claim 2, in which said movable portion moves linearly.

9. An actuator with a stepping motion function according to claim 3, in which said movable portion moves linearly.

10. An actuator with a stepping motion function according to claim 4, in which said movable portion moves linearly.

* * * * *